Aug. 29, 1967  F. N. SOMMER  3,338,731
METHODS OF EMBOSSING POLYVINYL CHLORIDE COATINGS
ON A TEXTILE OR LIKE SUPPORT
Filed Dec. 17, 1964
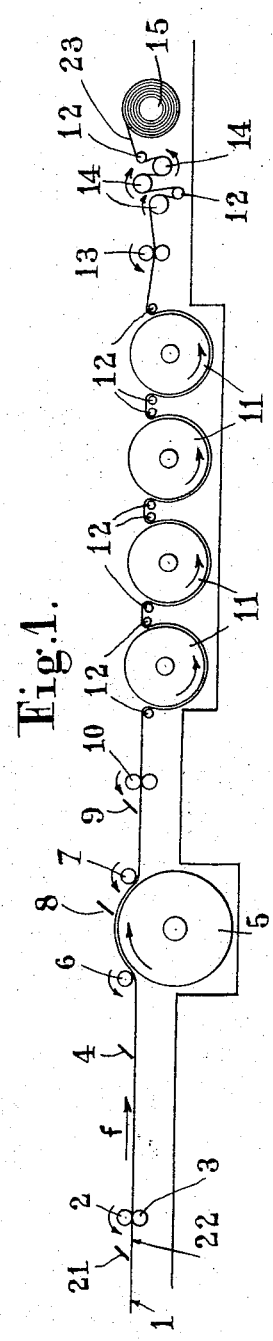
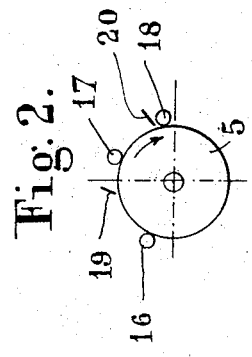

United States Patent Office 3,338,731
Patented Aug. 29, 1967

3,338,731
METHODS OF EMBOSSING POLYVINYL CHLORIDE COATINGS ON A TEXTILE OR LIKE SUPPORT
Francois Noël Sommer, Paris, France, assignor to S.E.T.E.P., Societe d'Etudes, de Recherches et d'Experimentations Industrielles de tous Procedes Nouveaux pour l'Alliance des Textiles et des Matieres Plastiques, Claire-et-Villette, près Sedan, Ardennes, France
Filed Dec. 17, 1964, Ser. No. 419,107
Claims priority, application France, Dec. 26, 1963, 958,482, Patent 1,390,270
5 Claims. (Cl. 117—10)

This invention relates to methods of embossing polyvinyl chloride (PVC) layers on textile and like supports.

The method constituting the subject-matter of the present invention is applicable to conventional plastic coatings and notably but not exclusively to floor lining products, that is, those industrial products consisting of a tagged jute felt on which a plurality of successive layers of PVC plastisol are deposited by means of doctor blades or like devices.

It is known that now conventional methods of manufacturing floor-lining articles of this character comprise a plurality of coating steps having each a predetermined and well-defined function.

The first coating also called sub-layer serves the purpose of filling the surface unevennesses of the jute felt.

The second coating or wearing layer constitutes the main layer and imparts at the same time the imperviousness to the material, as well as its general mechanical strength and wearing resistance.

The next coatings which may vary in number serve only the purpose of producing ornamental effects. To this end, the wearing layer is embossed to form negative cavities or hollows therein, and these cavities or hollows are subsequently filled with a plastic paste having a different colour than the wearing layer. When this result is attained the negative of hollow embossing may be resumed according to another pattern, and the other cavities or hollows thus formed are also filled with a paste having a third colour, and additional ornamental effects are thus obtained.

As a matter of fact, there is no reason for not repeating this operation to obtain a fourth colour, but as a rule customers are satisfied with three colours, that is, the colour of the initial wearing layer and the two colours applied in succession according to the above-described method.

In the conventional process, after depositing one of the plastisol layers, this layer is gelled by the application of heat, that is, by resorting to any suitable heating method, notably by using rotary heating contact rolls according to the method described in the U.S. Patent Ser. No. 244,649, filed on Dec. 14, 1962.

After this curing step the plastic surface is figured or embossed, that is, by forming therein a hollow pattern of the desired designs.

Then the cycle is resumed, that is, the next uncured layer is applied, cured and subsequently re-figured or re-embossed.

When the last colour has been applied, the curing step is followed not by a hollow embossing step but by a graining step, usually a very fine graining step giving to the finished article its final surface condition and appearance.

It is the essential object of the present invention to bring fundamental changes to this cycle of operations.

It may be pointed out that in the conventional method the embossing step is carried out after the curing step, and the PVC layer is fed to the embossing device at a temperature of about 180° C. and subsequently subjected at this temperature to the action of the embossing roll cooled by water circulation, whereby the surface of this embossing roll normally operates at a temperature of the order of 60° C. In fact, the requirements to be met for obtaining a satisfactory embossing or, in other words, a precise hollow pattern, are essentially a matter of relative temperature; thus, a considerable discrepancy should exist between the temperature of the PVC layer and the temperature of the embossing roll.

As already explained, in the conventional method this difference is rather considerable since the temperature of the PVC layer is about 180° C. when fed to a roll surface at about 60° C.

Now, according to this invention, it was found that the same embossing effects could be obtained by maintaining the aforesaid relatively important temperature differences but oppositely, i.e. by reversing their values. In other words, according to this invention, at least similar results are obtained by embossing the PVC layer in its uncured and cold state, that is, at room temperature, by means of a roll heated at about 180° C.

Practical tests further proved that definitely better patterning effects could be obtained with the method of the present invention as compared with the results afforded by the conventional methods.

Of course, the improved result thus obtained becomes final only after the curing step; in other words, the curing step is performed after the embossing step, as contrasted with the conventional method in which the embossing step is carried out after the curing step.

Under practical test conditions this novel method proved that still more important advantages could be obtained; thus, with the method of this invention it is no more necessary, after the first embossing step, to cure the PVC layer before effecting the second embossing step.

In other words, the heating effect exerted on an uncured PVC layer by the heated embossing roll develops on this uncured layer a pre-gelled film of a strength sufficient to keep said layer in a stable condition and thus permit the proper filling of the hollow pattern with a plastic paste of another colour, before effecting any curing step.

Under these conditions it is possible to carry out successively and repeatedly the hollow embossing and filling steps by using a plastic paste of another colour before performing any curing step proper.

Thus, instead of effecting a curing step after applying each colour as in the conventional method, this requirement is avoided and the product is subjected only to a final curing step.

Under these conditions the length of the production lines and the heating means (equipment and fuel) can be reduced to a substantial extent.

To permit the successive action of a plurality of rotary heating embossing rolls and of a plurality of doctors on the plastic material to be coated, there is used, according to an essential feature of the device used for carrying out the method of this invention, at least one drum of relatively great diameter which directs the material under a series of embossing rolls and doctors, for performing what is currently referred to in the technique as "embossing in exact ratio."

Said large drum acts only as a support and is free of any heating element; to this end, the web surface engaging this drum is the felt side, thus limiting any difficulty and any specific requirement as to the nature of the drum and to its surface condition.

Actual tests proved that the optimum diameter for a supporting drum of this character is about ten feet.

The use of this type of drum, which serves the purpose of fixedly and rigidly supporting the material during the action of said heated embossing rolls and said doctors, reveals another important advantage of the method of this invention. In fact, heretofore, with conventional devices the successive embossing rolls were arranged at such relative spacing that the normal reactions of the treated material which were due to the motion and expansion thereof, only patterns disposed at random in relation to one another could be used. Under these conditions the resulting effects were rather limited and figurative ornamental effects and designs such as leaf-works, flowers or any other regular patterns could not be obtained.

As contrasted with this limitation set up by the conventional method, with the arrangement according to this invention the coated web can neither move nor expand along the path separating successive embossing rolls.

Thus, the patterns formed by each embossing roll can be calculated to produce a final figurative ornamental effect such as leaves, flowers, etc., incorporating two or three colors, or any other desired combinations.

The combined use of heated embossing rolls on a cold web with one or more large-diameter drums as a support during the operation leads to the advantageous effects described hereinabove.

Furthermore, another novel effect may be obtained by using heated rolls on a cold, uncured web. Whatever the patterns or designs carried by the embossing rolls, they lead in any case to a systematic repeat effect which the users like or not, but was hitherto considered as a necessity in mass production, and to which the user compulsorily adapted him- or herself.

It was found that, insofar as the embossing and patterns were impressed on an uncured plastic paste, the repeat effect of these patterns could be broken or "destroyed" at random by the action of an additional embossing roll to which no other function was devolved; in other words, this separate step is carried out before the final curing step and does not impair whatsoever the final surface embossing operation effected after the curing step by means of a cold embossed roll.

Thus, this specific operation, i.e. the action of a heated embossing roll on a plastic paste having already received several colors and showing a predetermined pattern effect will "break" these patterns and impart an obvious uncertain appearance thereto. Thus, more particularly, considerably improved textile imitations are obtained.

To sum up, the combined or independent use, on an uncured plastisol layer, of heated embossing rolls and large-diameter drums acting as support means for said web during the embossing and coating steps leads to the following advantageous features:

(1) Considerable reduction in the length of production lines.

(2) Definite improvement of pattern precision.

(3) Figurative ornamental patterns and designs are obtained by laying successive colors with a high degree of precision, the resulting effects comparing favorably with those of textile printing.

(4) Possibility of "breaking" too regular designs, in order to produce uncertain effects and notably textile imitations.

The method of this invention will now be described by way of example with reference to the accompanying drawing, in which:

FIGURE 1 illustrates diagrammatically a typical form of embodiment of the means adapted to be used for carrying out the method of this invention.

FIGURE 2 is a modified form of embodiment of one of the means shown in FIGURE 1.

A support 1 consisting for example of a textile web of tagged jute felt travels in the direction of the arrow $f$ and passes firstly under a doctor 21 to receive a PVC plastisol sub-layer therefrom. The coated support 22 is at room temperature and moves under a first rotary embossing roll 2 heated at a temperature of about 180° C. and to which a counter-roll 3 is added; the embossing roll 2 is formed with a very fine embossed surface and causes a slight surface gelling of the PVC layer. Then the web travels firstly under another doctor 4 which spreads another layer of pasty plastisol adapted to constitute the wearing layer, and subsequently around a rotary drum 5 of relatively large diameter which acts as a counter-cylinder to a pair of rotary embossing rolls 6, 7 also heated at a temperature of about 180° C. and between which another doctor 8 is arranged for depositing a third pasty plastisol layer of another color, then under another doctor 9 spreading another plastisol layer of still a different color; then the web passes under an embossing roll 10 also heated at about 180° C. and serving the purpose of "breaking" the regular repetition of the patterns formed by the aforesaid embossing rolls 6, 7 and by the filling of the emboss cavities by means of the doctors 8 and 9, and finally around rotary heating drums 11 associated with guide rolls 12, these heating drums being adapted to gel the PVC coating.

The thus treated article is subsequently fed to the nip of a pair of rolls of which the upper one 13 acts as a surface-condition fine-embossed cold roll acting upon the gelled and hot PVC according to the conventional method; then the web is caused to pass over cooling drums 14 with guide rolls 12 and finally wound on a winding drum 15 for the finished product 23.

FIGURE 2 illustrates a modified arrangement of the large-diameter drum 5 for effecting the repeat embossing on the web. In this alternate arrangement three embossing rolls of the heating rotary type are used as shown at 16, 17 and 18, together with two coating doctors 19, 20 overlying the drum 5.

Of course, various modifications and alterations may be brought to the constructional details of the device described hereinabove, notably in connection with the number of the large-diameter drums, rotary heating embossing rolls and coating doctors associated therewith, as well as the other rotary heating embossing rolls and coating doctors disposed along the production line, without inasmuch departing from the spirit and scope of the invention as set forth in the appended claims.

What I claim is:

1. In a method of providing a cured polyvinyl chloride plastisol coating on a support in which method there is initially provided an uncured polyvinyl chloride plastisol layer on the support, the steps comprising embossing said uncured layer at room temperature by means of a roll heated to a temperature approximating 180° C. thereby to form cavities in said layer, filling the cavities with another layer of uncured polyvinyl chloride plastisol thereby to form a coating of uncured polyvinyl chloride plastisol constituted of the two layers, and curing said coating.

2. In a method of providing a cured polyvinyl chloride plastisol coating on a support in which method there is initially provided an uncured polyvinyl chloride plastisol layer on the support, the steps comprising embossing said uncured layer at room temperature by means of a roll heated to a temperature approximating 180° C. thereby to form cavities in said layer, filling the cavities with another layer of uncured polyvinyl chloride plastisol, embossing said other layer thereby to form cavities in said other layer, filling said cavities in said other layer with additional uncured polyvinyl chloride plastisol, whereby there is formed a coating of uncured polyvinyl chloride plastisol constituted of the three layers, and curing said coating.

3. A method according to claim 2 in which the embossing and filling cycle is repeated several times.

4. A method according to claim 2 in which the embossing and filling are done on a single large diameter drum according to the "embossing in exact ratio" method.

5. A method according to claim 4, further comprising, prior to the curing step, subjecting the polyvinyl chloride to an additional embossing for breaking at random the repetitive effect of the patterns formed by the other embossing steps.

References Cited

UNITED STATES PATENTS

| | | | |
|---|---|---|---|
| 2,874,416 | 2/1959 | Burnett | 264—216 X |
| 3,050,784 | 8/1962 | Jerothe. | |
| 3,236,926 | 2/1966 | Wisotzky | 117—10 |

FOREIGN PATENTS 936,234  12/1955  Germany.

ROBERT F. WHITE, *Primary Examiner.*

T. J. CARVIS, *Assistant Examiner.*